UNITED STATES PATENT OFFICE.

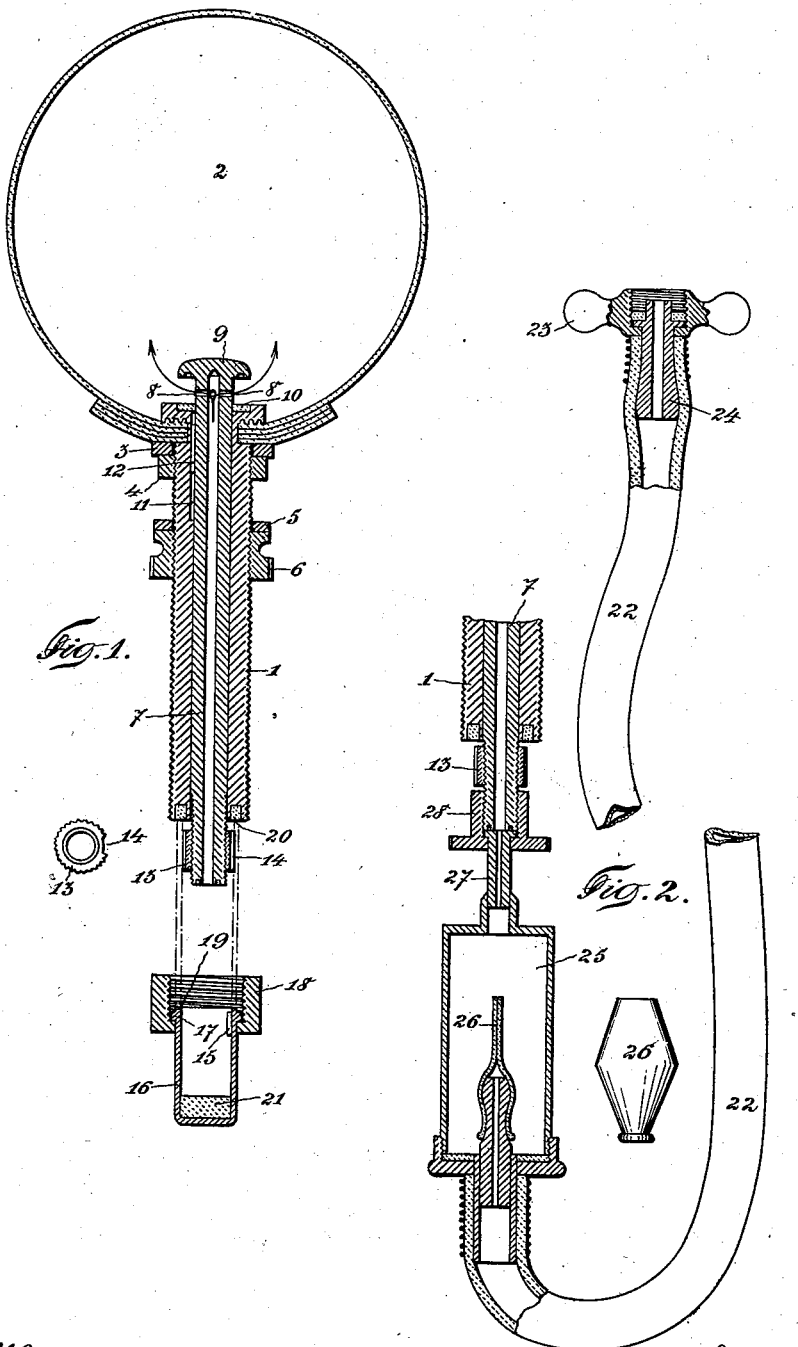

ALBERT DE GINGINS, OF CHÂTEAU DE GINGINS, CANTON DE VAUD, SWITZERLAND.

INFLATING DEVICE FOR PNEUMATIC TIRES.

SPECIFICATION forming part of Letters Patent No. 724,845, dated April 7, 1903.

Application filed February 5, 1902. Serial No. 92,652. (Model.)

*To all whom it may concern:*

Be it known that I, ALBERT DE GINGINS, of Château de Gingins, Canton de Vaud, Switzerland, have invented certain new and useful Improvements in and Relating to Inflating Devices for Pneumatic Tires, of which the following is a specification.

It is important that the valve through which compressed air is introduced into pneumatic tires be perfectly air-tight; but it is none the less important that the device used for inflating the tire should cause the inflation to be continuous and even and without jerks, especially so when the inner pressure which is to be overcome begins to balance or counteract the pressure used in inflation.

I am aware that valves have been made which are very nearly air-tight; but heretofore such valves have been disadvantageous, because of the very great resistance to be overcome by the pumps used for inflating tires in which such valves were fitted.

The object of the present invention is to provide an improved device overcoming this objection, and in carrying out my invention I employ a valve-casing secured in the pneumatic tire, a valve-tube within and movable longitudinally in said casing, a valve and valve-seat at the inner end of said casing, means for locking the valve on its seat, means for closing the outer end of the valve-tube, an air-chamber and a check-valve therein, the said air-chamber being adapted to be permanently or removably connected to the outer end of the valve-tube, and means for supplying air under pressure to the said air-chamber, which largely takes up the pulsations due to the pump, and thereby supplies the air under even pressure to the tire while being inflated. The check-valve opens to permit air under excess pressure to pass out and closes automatically to hold the pressure of air in the air-chamber.

In the drawings, Figure 1 is an axial section of an air-tight pneumatic-tire valve. Fig. 2 is a section and broken elevation of the air-chamber, check-valve, and connections therefrom to the pump.

1 is the usual valve-casing, which is fixed in the wall of the tubular air-chamber 2 of the tire by means of nuts 3 and 4. Nuts 5 6 are also employed with the said valve-casing 1 for securing the same to the rim of the vehicle-wheel.

7 is a valve-tube fitting the casing 1 and having a central longitudinal opening adapted to conduct the compressed air from the pump to the air-chamber 2 through the lateral openings 8 adjacent to the end of the valve-tube 7. The said valve-tube 7 has a head 9, by which the air-chamber is closed when the said head bears upon the seat 10, which is made of any suitable material. The valve-casing 1 is provided with a groove 11, in which the lateral projection 12 of the valve-tube 7 slides to prevent the valve-tube 7 from rotating on itself when the nut 13 is turned. The nut 13 is also provided with a groove 14, with which an inner projection 15 of the cap or cover 16 engages. This cap or cover 16 is provided with a collar 17, which forms a bearing by means of which the edge 19 of the cap or collar 16 is pressed against the elastic packing 20 of the casing 1 by screwing the nut 18 on the casing 1.

The cap or cover 16 is provided with an elastic packing 21, adapted to bear against the end of the valve-tube 7 to form an air-tight joint therewith. When both the nuts 13 and 18 have been screwed tight in place, there are therefore three air-tights joints, the first one between the head 9 and the seat 10, the second one between the edge 19 and the packing 20, and the third one between the extremity of the valve-tube 7 and the packing 21 of the cap or cover 16. When the tire is to be inflated, the cap or cover 16 is removed and the nut 13 loosened in order to permit the valve-tube 7 to be slightly moved to and fro. The said valve-tube 7 being free and moved in the casing 1, (to expose the openings 8,) compressed air ejected by the pump into the channel of the valve-tube 7 passes into the air-chamber 2 through the openings 8.

In connection with the valve hereinbefore described I employ an air-chamber containing a check-valve and connections therefrom to the pump or other means for forcing air into and compressing the same within the said chamber. This air-chamber may be removably or permanently attached to the end of the valve-tube 7, in which latter case the cap 16 may be dispensed with.

Referring to Fig 2, the flexible pipe 22 is provided at one end with a junction-nut or coupling 23, which is free to turn on the mouthpiece 24 of said pipe 22. The pipe 22 is provided at the opposite end with a connector attaching the same to an air-chamber 25, containing a check-valve 26. The said air-chamber 25 is provided with a connection 27, having a junction-nut 28, free to turn on said tube, and which may be screwed upon the extremity of the valve-tube 7, as indicated in Fig. 2.

As hereinbefore stated, the air-chamber and check-valve may or may not be permanently connected to the tube-valve; but I deem it advisable in some instances to have these parts permanently secured to the valve-tube of the tire-valve. The valve 26 is in the nature of lips of elastic or flexible material that open or yield to permit air under excess pressure to pass into the air-chamber 25 and which close automatically the moment the pressure of air is less in the tube 22 than in the air-chamber 25. This valve 26 is connected to a suitable rigid support.

The operation of inflating the tire with the above-described apparatus is as follows: The nut 13 is first loosened enough to allow the valve-tube 7 to be moved in the casing sufficiently to permit the openings 8 to approximately clear the valve-seat 10. In doing this it is to be understood that the air-chamber and check-valve have been connected to and move with the valve-tube 7. The flexible tube 22 is now attached and the pump operated to supply the chamber with compressed air, which naturally flows into the tire-chamber smoothly and evenly, not imparting the impulses of the pump to the tire, equalizing the pressure between the air-chamber and the tire-chamber. After the desired point of inflation is attained the nut 13 is drawn up, bringing the head 9 against the seat 10 and closing the valve.

It is to be noted that this inflating device is particularly useful in connection with the tires of heavy wheels—as, for instance, with large wagons and truck-automobiles.

I claim as my invention—

1. In a device for inflating pneumatic tires, the combination with a valve to be secured in the tire, of an air-chamber and a connection between the same and said valve, a check-valve in said air-chamber and means for connecting said air-chamber and check-valve to the pump, substantially as set forth.

2. In a device for inflating pneumatic tires, the combination with a valve to be secured in the tire, of an air-chamber and means for securing the valve-casing to the wheel-rim, and a connection between the same and said valve, a check-valve in said air-chamber and means for connecting said air-chamber and check-valve to the pump, substantially as set forth.

3. In a device for inflating pneumatic tires, the combination with a valve to be secured in the tire, of an air-chamber, means for securing the valve-casing to the wheel-rim, and a permanent connection between the same and said valve, a check-valve in said air-chamber and means for connecting said air-chamber and check-valve to the pump, substantially as set forth.

4. In a device for inflating pneumatic tires, the combination with a valve-casing secured to the pneumatic tire, of a movable valve-tube extending longitudinally through said casing, a head integral with said valve-tube, means for securing an air-tight joint between said parts, an air-chamber communicating with said valve-tube, a check-valve in said chamber, and means for connecting the said chamber and check-valve with a pump, substantially as set forth.

5. In a device for inflating pneumatic tires, the combination with a valve-casing secured to the pneumatic tire, of a movable valve-tube extending longitudinally through said casing, a head integral with said valve-tube, a valve-seat in said casing being adapted to receive the said head, a nut on the opposite end of said valve-tube adapted to be turned to cause the said head to engage the valve-seat, an air-chamber communicating with said valve-tube, a check-valve in said chamber, and means for connecting the said chamber and check-valve with a pump, substantially as set forth.

In testimony that I claim the foregoing as my invention I have signed my name in presence of two subscribing witnesses.

ALBERT DE GINGINS.

Witnesses:
FERDINAND KULLMAMY,
JEAN GRUND.